United States Patent [19]

Fukuda et al.

[11] 3,726,763

[45] Apr. 10, 1973

[54] METHOD FOR PRODUCING CITRIC ACID

[75] Inventors: Hideo Fukuda, Sumiyoshi-ku, Osaka; Takashi Suzuki, Takarazuka, Hyogo; Shunichi Akiyama, Otokuni-gun, Kyoto; Yasuhiro Sumino, Suma-ku, Kobe, all of Japan

[73] Assignee: Takeda Chemical Industries, Ltd., Higashi-ku, Osaka, Japan

[22] Filed: Feb. 22, 1971

[21] Appl. No.: 117,705

[30] Foreign Application Priority Data

Feb. 24, 1970    Japan ............................... 45/15810

[52] U.S. Cl. .................................................. 195/28 R
[51] Int. Cl. ............................................... C12d 1/04
[58] Field of Search ........................... 195/3 H, 28, 29, 195/30, 36, 37, 47

[56] References Cited

FOREIGN PATENTS OR APPLICATIONS 1,571,551    6/1969    France

*Primary Examiner*—A. Louis Monacell
*Assistant Examiner*—Gary M. Nath
*Attorney*—Wenderoth, Lind & Ponack

[57] ABSTRACT

This invention a method for production of citric acid which comprises innoculating a citric acid accumulating yeast belonging to the genus *Candida*, capable of utilizing hydrocarbons, in a medium containing a specific weight ratio of phosphorus to hydrocarbon, incubating the yeast until citric acid is produced and recovering the thus-produced citric acid.

7 Claims, No Drawings

METHOD FOR PRODUCING CITRIC ACID

This invention relates to a method for producing citric acid.

More particularly, this invention relates to a method for producing citric acid which comprises inoculating a citric acid-accumulating yeast belonging to the genus *Candida*, capable of utilizing hydrocarbons, in a culture medium containing phosphorus and a hydrocarbon in a weight ratio of from $0.1 \times 10^{-3} : 1$ to $2.0 \times 10^{-3} : 1$; incubating the culture until citric acid is substantially accumulated in the medium; and recovering the so-accumulated citric acid therefrom.

Citric acid is in a great demand for use, e.g., as an acidulant in beverages and in pharmaceutical preparations.

It has been reported that certain yeasts accumulate citric acid (The Proceeding of the Congress in 1968 of Agricultural Chemical Society of Japan, p 183). However, the yield of citric acid that can thus be obtained per unit weight of the hydrocarbon employed is seriously influenced by the composition of the medium and the presence of impurities contained in the medium, particularly metal ions, which has been known as disturbing stable commercial production of citric acid.

The present inventors have been engaged for many years in the study of the organic acid metabolism of the genus *Candida*, employing hydrocarbons as carbon sources. In the production of citric acid by the cultivation of a yeast on a medium containing hydrocarbons, in order to maintain the yield of citric acid at high levels relative to the hydrocarbon, it is desirable to control the amount of growth of the yeast within a suitable range. For this purpose, there can be employed such techniques as limitting the amount of one or more of the medium components to less than the amount required for the maximum growth of microorganisms, causing the fermentation pH to deviate from the optimum pH range, adjusting the temperature or oxygen supply, or allowing a suitable amount of a growth inhibitor to be present in the medium, thereby controlling the amount of the growth of organisms.

With those techniques, however, the organisms are permitted to show only retarded growth and, therefore, it is very difficult to achieve high, stabilized yield levels in a short incubation period.

In this regard, the present inventors have found that the amount of citric acid to be accumulated by those organisms is considerably influenced by the phosphorus to hydrocarbon ratio (hereinafter often referred to merely as P/C ratio) of the medium and that the amount of citric acid could reach significantly high levels if P/C ratio is controlled within certain limits. While the physiological and biochemical mechanisms involved in the realization of those results are not yet clear, it is thought, in the light of the fact that phosphorus is an essential factor in energy metabolism, that controlling the amount of this factor leads to the depression of an excessive loss of the carbon utilization and, accordingly, to an improved yield.

The yeasts which can be employed in the practice of this invention may be any and all strains that are capable of utilizing hydrocarbons to accumulate citric acid. The mutants which are derived either spontaneously or artificially from those parent strains may likewise be utilized. Among those strains and mutants, however, yeasts belonging to the genus *Candida* can be employed to particular advantage in the purpose of this invention.

For instance, the following strains, as well as some yeasts that can be isolated from the natural circumstances, may be mentioned.

*Candida tropicalis*
*Candida lipolytica*
*Candida albicans*
*Candida rugosa*
*Candida guilliermondii*
*Candida brumptii*
*Candida chalmersi*
*Candida guilliermondii* var. *membranaefaciens*
*Candida parapsilosis* var. *tokyoensis*
*Candida pulcherrima*

While the medium to be employed in the present invention should vary somewhat with the species of microorganisms to be employed, the following carbon sources may prove of advantage. For instance, n-undecane, n-dodecane, n-tetradecane, n-pentadecane, n-hexadecane, n-heptadecane, n-octadecane, n-nonadecane, n-eicosane and other n-alkanes; mixtures of two or more of those n-alkanes; and such petroleum oil fraction as heavy gas oil, kerosene, etc.

Among the useful nitrogen sources, are inorganic ammonium salts such as $NH_4Cl$, $(NH_4)_2SO_4$, $NH_4OH$, $NH_4NO_3$, etc., organic ammonium salts such as ammonium acetate, etc., and various nitrogenous matters such as dried yeast, yeast extract, meat extract, fish meal, soy bean meal, corn steep liquor, peptone, distiller's byproducts, etc. Those sources may be used either singly or in combination.

In the medium to be employed in the present invention, there are incorporated, as required, besides the carbon and nitrogen sources mentioned above, various inorganic salts such as those of iron, manganese, magnesium, calcium, etc. and the nutrients necessary for the growth of the organism.

In the practice of this invention, those materials are suitably mixed to prepare a medium of the desired composition.

What is important, however, is to control the weight ratio of phosphorus to hydrocarbon in the range of $0.1 \times 10^{-3} : 1$ to $2.0 \times 10^{-3} : 1$ where citric acid is accumulated in a yield not less than about 40 percent relative to the maximum yield.

More desirably, P/C ration is to be kept in the range of $0.3 \times 10^{-3} : 1$ to $2.0 \times 10^{-3} : 1$ where citric acid is accumulated in a yield not less than about 60 percent relative to the maximum yield. Most desirably P/C ratio is to be kept in the range of $0.5 \times 10^{-3} : 1$ to $1.2 \times 10^{-3} : 1$ where citric acid is accumulated in a yield not less than about 80 percent relative to the maximum yield. These relations are disclosed in Table 1.

TABLE 1.—RELATIVE YIELD OF CITRIC ACID (PERCENT)

| Microorganisms | P/C ratio ($10^{-3}$) | | | | | | | | |
|---|---|---|---|---|---|---|---|---|---|
| | 0.1× | 0.2× | 0.3× | 0.5× | 0.6× | 1.0× | 1.2× | 2.0× | 4.0× |
| *Candida lipolytica* (ATCC 20237) | 40.3 | 50 | 64.5 | 8.3 | 96 | 100 | 97 | 64 | 55.5 |
| *Candida tropicalis* (ATCC 20115) | 49.5 | 59 | 70.0 | 81 | 93.5 | 100 | 97 | 65 | 57.5 |
| *Candida rugosa* (ATCC 20306) | 63 | 70 | 79.5 | 90.1 | 100 | 100 | 97 | 61.2 | 50.5 |
| *Candida albicans* (ATCC 20308) | 42.0 | 45.1 | 62.0 | 80 | 100 | 100 | 100 | 61.1 | 34.0 |

The sources of phosphorus which may be employed for this purpose include, for example, inorganic phosphoric compounds such as inorganic phosphoric acids, their anhydries and salts, organic phosphoric compounds such as organic phosphoric acids, their esters and salts, and phosphorus-containing materials. Specifically, ortho-phosphoric acid, meta-phosphoric acid, polyphosphoric acid, phosphoric anhydride, their alkali metal salts and ammonium salts, ribonucleic acids, phytic acid, their alkali metal salts, esters and esters of sugar and sugar alcohols (e.g., glycerophosphoric acid, glucose phosphate, etc.), dried yeast, yeast extract, casein, meat extract, fish meal, defatted soybean meal, corn steep liquor, corn infusion, distiller's waste, ribonucleic acid, etc. may be mentioned, for example.

When the nitrogen sources of medium are natural substances which contain phosphoric acid compounds, it is necessary to determine their phosphorus content and take it into account in the control of the total phosphorus content of the medium within the range mentioned above.

The pH of the medium may be selected within the wide range suitable for the growth of the microorganism employed and, generally, ranges from pH 2 to pH 7 and, desirably, from pH 4 to pH 6.5.

When a depression in pH of the medium is encountered in the course of incubation due to the production of acids, it is advisable to conduct the fermentation with the pH of the medium being somehow controlled within the above range. To effect their control, the incubation may be conducted while an acid-neutralizer such as, for example, $CaCO_3$, $Ca(OH)_2$, $NH_4OH$, $NaOH$ or $Na_2CO_3$ is added to the medium from time to time. Alternatively, to provide for a buffering effect, a neutralizer such as $CaCO_3$ may be previously added to the medium in an amount commensurate with the possible amount of pH depression.

While the incubation temperature varies somewhat with different species of microorganisms, it is generally advantageous to conduct the fermentation in the temperature range of 20° to 35° C and, especially, 25° to 30° C. Since the method of this invention is carried out under aerobic conditions, the shake cultural method or the aerated cultural method involving the use of a tank fermentor equipped with an agitator may be employed to advantage. In those cases, where defoaming is required, conventional antifoaming agents such as polyoxypropylene derivatives, soybean oil, silicone oil, lard oil, etc., can be employed with success.

Thus produced citric acid may be easily separated and recovered from the cultured broth in per se conventional manners. Thus, by the use of, solely or in combination, such techniques as neutralization, heating, cooling, precipitation, filtration, centrifugation, concentration, decolorization, crystallization, desiccation, column chromatography and the like, the citric acid may be easily recovered in crystalline form.

The following examples further illustrate their invention. It is to be understood that these examples are by no means restrictive of the scope of the present invention.

In the examples and claims, ATCC numbers indicate the accession numbers at American Type Culture Collection, Maryland, U.S.A.

The relationship between part(s) by weight and part(s) by volume is the same as that between gram(s) and milliliter(s).

EXAMPLE 1

A culture of *Candida lipolytica* ATCC 20237 is used to inoculate 40 parts by volume of a sterilized aqueous medium (pH 6.0) which contains a hydrocarbon mixture composed of n-paraffin having 13 to 15 carbon atoms (2 percent), $NH_4Cl$ (0.2 percent), $KH_2PO_4$ (0.05 percent), $MgSO_4 \cdot 7H_2O$ (0.05 percent), $MnSO_4 \cdot 7H_2O$ (0.001 percent), $FeSO_4 \cdot 7H_2O$ (0.001 percent) and $CaCO_3$ (0.5 percent), then incubated at 28° C under agitation and aeration for 48 hours. Five parts by volume of the resulting pre-culture is transferred to 100 parts by volume each of the following media A and B. (The difference of A and B lies only in the content of $KH_2PO_4$):

n-paraffin (same as above) (6 percent), $NH_4Cl$(0.2 percent), $MgSO_4 \cdot 7H_2O$(0.03 percent), $MnSO_4 \cdot 7H_2O$(0.001 percent), $FeSO_4 \cdot 7H_2O$(0.001 percent), dry yeast (phosphorus content 0.0012 percent)(0.1 percent), $CaCO_3$(0.5 percent) and $KH_2PO_4$(0.018 percent (medium A) or 0.071 percent (medium B)). The cultures are incubated at 28° C under aeration and agitation. On the second day $CaCO_3$(0.5 percent) and on the third day $CaCO_3$(3 percent) are aseptically added to adjust the pH of the medium around 5, and the incubation is continued for a total of 5 days. The yields of citric acid produced and accumulated in the cultured broth are shown below.

| | Medium A | Medium B |
|---|---|---|
| $KH_2PO_4$ | 0.018% | 0.071% |
| P/C | $1.0 \times 10^{-3} : 1$ | $3.0 \times 10^{-3} : 1$ |
| Citric acid | 72mg./ml. | 38mg./ml. |

One hundred parts by volume each of those cultured broths, is collected, and 5 parts by volume of 6N—HCl is added so as to dissolve the sediment, followed by centrifugation.

The supernatant is adjusted to pH 7.0 with $Ca(OH)_2$ (10 percent) and kept standing for 60 minutes at 80° C. The resulting precipitates are recovered by filtration, suspended in a small quantity of water, to which $H_2SO_4$(percent) is added dropwise so as to dissolve the suspended particles. The resulting new white sediment is separated by filtration.

The filtrate is concentrated until a thin syrup is obtained. This syrup is kept standing in a refrigerator for 3 days to give 6.4 parts by weight in case of medium A and 3.6 parts by weight of citric acid in case of medium B, respectively.

EXAMPLE 2

A culture of *Candida tropicalis* ATCC 20115 is used to inoculate 100 parts by volume each of two different aqueous media C and D (pH 6.5) (The difference of medium C and D lies in $KH_2PO_4$ content):

n-paraffin mixture of 12 to 18 carbon atoms (purity 95 percent) (4 percent), $NH_4Cl$(0.3 percent), $MgSO_4 \cdot 7H_2O$ (0.05 percent), $FeSO_4 \cdot 7H_2O$ (0.05 percent), $CaCO_3$(0.5 percent) and $KH_2PO_4$ (0.005 percent (medium C) or 0.013 percent (medium D) bromocresol purple (10 ppm), corresponding to P/C ratio of $0.2 \times 10^{-3} : 1$ or $0.5 \times 10^{-3} : 1$).

The cultures are incubated at 28° C for 3 days while adding NH₄OH (14 percent aqueous solution) to the media to keep the color of the media yellowish green. The citric acid yields from the two cultured broths are 18 mg./ml. in case of medium C and 38 mg./ml. in case of medium D, respectively.

After removing the yeast cells, each supernatant is adjusted to pH 7.0 with 30 percent Ca(OH)₂ and kept standing under 80° C for 1 hour. After the fluids are cooled to room temperature, the precipitates are recovered by filtration.

It is then suspended in a small quantity of water and 30 percent H₂SO₄ is added dropwise so as to dissolve the suspended particles. The resulting new sediment is removed by filtration.

Treatment of the supernatant by procedures similar to those described in Example 1 yields 1.4 parts by weight in case of medium C and 2.9 parts by weight of citric acid in case of medium D, respectively.

EXAMPLE 3

The following three yeasts of the genus *Candida* are used to inoculate two different media E and F:

n-hexadecane (4 percent), NZ-amine (Schefield Chemical Company, U.S.A., Phosphorus content 2.1 percent) (0.1 percent), MgSO₄·7H₂O (0.05 percent), NH₄Cl(0.2 percent) and KH₂PO₄ (0.0048 percent (medium E) or 0.034 percent (medium F)), bromocresol purple (20 ppm).

The cultures are incubated in the same manner as described in Example 2 and the results are set forth in Table 2.

TABLE 2

Titers of Citric Acid in Cultured Broth

| | Medium E | Medium F |
|---|---|---|
| P/C ratio | 0.8 × 10⁻³:1 | 2.5 × ⁻³:1 |
| | mg/ml. | mg/ml. |
| (1) *Candida albicans* (ATCC 20308) | 32 | 18 |
| (2) *Candida rugosa* (ATCC 20306) | 28 | 12 |
| (3) *Candida quilliermondii* var. *membranaefaciens* (ATCC 20282) | 21 | 7 |

EXAMPLE 4

The following three yeasts of the genus *Candida* and media of various phosphorus content described in Table 3 are used for the production of citric acid, and the results are set forth in Table 4.

(Microorganisms)

1. *Candida pulcherrima* ATCC 20307
2. *Candida chalmersi* NRRL Y-1260
3. *Candida guilliermondii* ATCC 9058

(Basal medium)

n-paraffin mixture of 12 to 15 carbon atoms (purity 99.8 percent)(8 percent), MgSO₄·7H₂O (0.05 percent), MnSO₄·6H₂O (0.001 percent), CaCO₃(0.1 percent), (NH₄)₂SO₄(0.4 percent), thiamine·HCl (0.005 percent), bromocresol purple (0.002 percent).

TABLE 3.—PHOSPHORUS SOURCES AND CONTENT

| Medium | G | H | I | J | K | L | M | N | O |
|---|---|---|---|---|---|---|---|---|---|
| Ingredients (percent) | Casein (0.1). | Casein (0.1). CaHPO₄ (0.04). | Casein (0.1). CaHPO₄ (0.1). | C.S.L. (0.05). | C.S.L. (0.1). RNA (0.1). | C.S.L. (0.1). RNA (0.1). KH₂PO₄ (0.03). | Peptone (0.4). (NH₄)₂HPO₄ (0.001). | Peptone (0.4). (NH₄)₂HPO₄ (0.03). | Peptone (0.4). (NH₄)₂HPO₄ (0.1). |
| P:C ratio (×10⁻³) | 0.0875:1 | 1.2525:1 | 4.0775:1 | 0.0875:1 | 1.201:1 | 2.056:1 | 0.08875:1 | 0.9365:1 | 2.985:1 |

NOTE.—P content of each ingredient, is as follows: Casein: 0.71%; C.S.L.:1.4%; RNA: 8.21%; peptone 0.11%.

TABLE 4

| | Yeast | | | | | | | | |
|---|---|---|---|---|---|---|---|---|---|
| | *Candida pulcherrima* (ATCC 20307) | | | *Candida chalmersi* NRRL 1-1260) | | | *Candida guilliermondii* (ATCC 9058) | | |
| Medium | G | H | I | J | K | L | M | N | O |
| Yield (mg./ml.): | | | | | | | | | |
| Citric acid | 42 | 88 | 51 | 28 | 49 | 27 | 18 | 53 | 29 |
| plus Isocitric acid | 18 | 32 | 17 | 13 | 21 | 7 | 8 | 22 | 12 |

What we claim is:

1. A method for producing citric acid which comprises inoculating a citric acid-accumulating yeast belonging to the genus *Candida*, capable of utilizing hydrocarbons, in a medium containing phosphorus and a hydrocarbon in a weight ratio of 0.1 × 10⁻³ : 1 to 2.0 × 10⁻³ : 1; incubating the culture until citric acid is substantially accumulated in the medium, and recovering the so-accumulated citric acid therefrom.

2. A method according to claim 1, wherein said phosphorus is added in the form of one selected from the group consisting of an inorganic phosphoric compound, an organic phosphoric compound, and a phosphorus-containing material or a mixture thereof.

3. A method according to claim 2, wherein said inorganic phosphoric compound is ortho-phosphoric acid, meta-phosphoric acid, polyphosphoric acid, their anhydride, their metal salts or ammonium salts.

4. A method according to claim 2, wherein said organic phosphoric compound is ribonucleic acids, phytic acid, their alkali metal salts, esters, or the esters of sugar or sugar alcohol.

5. A method according to claim 2, wherein said phosphorus-containing material is dried yeast, yeast extract, casein, meat extract, fish meal, defatted soybean meal, corn infusion or distiller's waste.

6. A method according to claim 1, wherein the incubation temperature is between 20° and 35°C.

7. A method according to claim 1, wherein the pH of culture medium is kept between 2 and 7.

* * * * *